United States Patent [19]
Dudley et al.

[11] Patent Number: 5,559,407
[45] Date of Patent: Sep. 24, 1996

[54] AIRFLOW CONTROL FOR VARIABLE SPEED BLOWERS

[75] Inventors: Kevin F. Dudley, Cazenovia; Peter G. Pierret, Fayetteville, both of N.Y.

[73] Assignee: Carrier Corporation, Syracuse, N.Y.

[21] Appl. No.: 236,824

[22] Filed: May 2, 1994

[51] Int. Cl.⁶ .................................................. H02P 7/50
[52] U.S. Cl. .......................... 318/439; 388/809; 417/20
[58] Field of Search .................... 417/53, 17, 20; 128/681; 318/432, 254, 439, 138, 461; 388/801, 809, 811, 814

[56] References Cited

U.S. PATENT DOCUMENTS

| | | | |
|---|---|---|---|
| 4,468,171 | 8/1984 | Katsumata et al. | 417/53 |
| 4,638,233 | 1/1987 | Erdman | 318/644 |
| 4,732,318 | 3/1988 | Osheroff | 236/49 |
| 4,969,466 | 11/1990 | Brooks | 128/681 |
| 4,978,896 | 12/1990 | Shah | 318/254 |
| 5,075,607 | 12/1991 | Koharagi et al. | 318/432 |
| 5,103,629 | 4/1992 | Mumford et al. | 60/39.06 |

Primary Examiner—John W. Cabeca

[57] ABSTRACT

Apparatus and method for controlling an air distribution system of the type which includes a motor drivingly associated with a blower and a duct system, and further including a target air flow rate signal which represents a target air flow for the air distribution system. The apparatus and method provide control of the motor speed to maintain a rate of air flow in the system at substantially the target air flow rate regardless of the status pressure therein. The apparatus provides a speed signal representative of the speed of the motor, and a control signal in response to the target air flow rate signal and the speed signal, and controls the motor speed in response to the control signal. The central signal is provided independent of the duct system. Motor speed is controlled by applying a voltage to the motor which varies in accordance with the control signal for maintaining the rate of air flow in the system at substantially the target air flow rate regardless of the static pressure therein. The control signal is provided by implementing a constant air flow control algorithm which is responsive to both the target air flow rate signal and the speed signal.

13 Claims, 2 Drawing Sheets

| CFM (CALC) | PWM | RPM | CFM (TEST) | STATIC PRESSURE | TORQUE | PERCENT ERROR |
|---|---|---|---|---|---|---|
| 545 | 23 | 500 | 520 | 0.07 | 6.0 | 5 |
| 637 | 34 | 683 | 619 | 0.19 | 9.0 | 3 |
| 637 | 32 | 583 | 652 | 0.08 | 8.8 | 2 |
| 717 | 43 | 733 | 723 | 0.22 | 11.7 | 1 |
| 723 | 40 | 633 | 756 | 0.07 | 11.2 | 4 |
| 804 | 52 | 783 | 816 | 0.23 | 14.6 | 1 |
| 822 | 52 | 750 | 846 | 0.16 | 15.0 | 3 |
| 890 | 64 | 883 | 904 | 0.31 | 17.8 | 2 |
| 914 | 62 | 800 | 949 | 0.15 | 18.1 | 4 |
| 979 | 76 | 950 | 1007 | 0.33 | 21.9 | 3 |

5,559,407

AIRFLOW CONTROL FOR VARIABLE SPEED BLOWERS

BACKGROUND OF THE INVENTION

1. Field of the Invention

This invention relates generally to systems for conditioning air and specifically to control systems for maintaining a desired flow rate of conditioned air through at least part of the system regardless of the static pressure therein.

2. Description of the Background Art

In the past, various different techniques have been used in an attempt to flow air through a contained space of a system including air distribution systems for conditioning the temperature of the air with the rate of such air flow being related to the static pressure in the system. The rate of air flow (CFM—cubic feet per minute) through the air distribution system also affects the speed and torque of a motor used in the system.

One approach of the past involved the laborious task of matching the motor speed and torque with the proper fan to approximate the desired air flow rate for the particular contained space and static pressure of the particular air distribution system. However, this did not accommodate variations in the static pressure in the air distribution system caused by alterations in the system such as opening, closing or adjusting of a damper connecting a conditioned space in air flow relation with the system. In addition, other devices, such as filters and heat exchangers, may alter the static pressure within the duct system.

If the fan or blower utilized in such prior art systems was of the fan or blade type, a decrease in the static pressure acting on such fan resulted in an increase in the speed of the fan and the electric motor driving it. Conversely, if the static pressure on the fan was increased, the speed of the fan and electric motor decreased. Thus, the speed of the fans and electric motors utilized in the past varied inversely with a variation of the static pressure in the system.

Another prior art approach has been to compensate for the alterations in the speed of the fans and the electric motors by employing an apparatus for controlling the motor speed which required the calculation of constants specific for each apparatus and air distribution system combination. This approach further required signal comparison devices and motor current sensing devices. Additionally, this approach did not directly calculate the actual air flow rate in the air distribution system.

OBJECTS OF THE INVENTION

It is an object of the present invention to provide an improved system for conditioning air and for maintaining a preselected air flow rate of the conditioned air through at least part of the system regardless of the static pressure therein.

It is a further object of the present invention to provide an improved airflow control system which can be utilized in conjunction with numerous duct systems without the need for calibration particular to the specific duct system.

It is another object of the present invention to provide an improved method which directly calculates the actual air flow of the air distribution system.

It is yet another object of the present invention to provide an improved method for maintaining a preselected air flow rate of the conditioned air through at least part of the system regardless of the static pressure therein.

Yet another object of the present invention is to provide an improved air flow control system which is simple in design, easily manufactured, and economically manufactured.

SUMMARY OF THE INVENTION

These and other objects of the present invention are achieved by an apparatus for controlling an air distribution system of the type which includes a motor drivingly associated with a blower and further including a target air flow rate signal which represents a target air flow for the air distribution system, the apparatus providing control of the motor speed to maintain a rate of air flow in the system at substantially the target air flow rate regardless of the static pressure therein. The apparatus includes means for providing a speed signal representative of the speed of the motor, means for providing a control signal in response to the target air flow rate signal and the speed signal, and means for controlling the motor speed in response to the control signal.

The means for controlling the motor speed applies a voltage to the motor which varies in accordance with the control signal for maintaining the rate of air flow in the system at substantially the target air flow rate regardless of the static pressure therein. The means for providing a control signal provides the control signal by implementing a constant air flow control algorithm which is responsive to both the target air flow rate signal and the speed signal generated by the means for providing a speed signal.

The foregoing and other objects, features and advantages of the present invention will become more apparent in light of the following detailed description and accompanying drawings.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts, and wherein;

DETAILED DESCRIPTION OF THE PREFERRED EMBODIMENT

Figure 1:
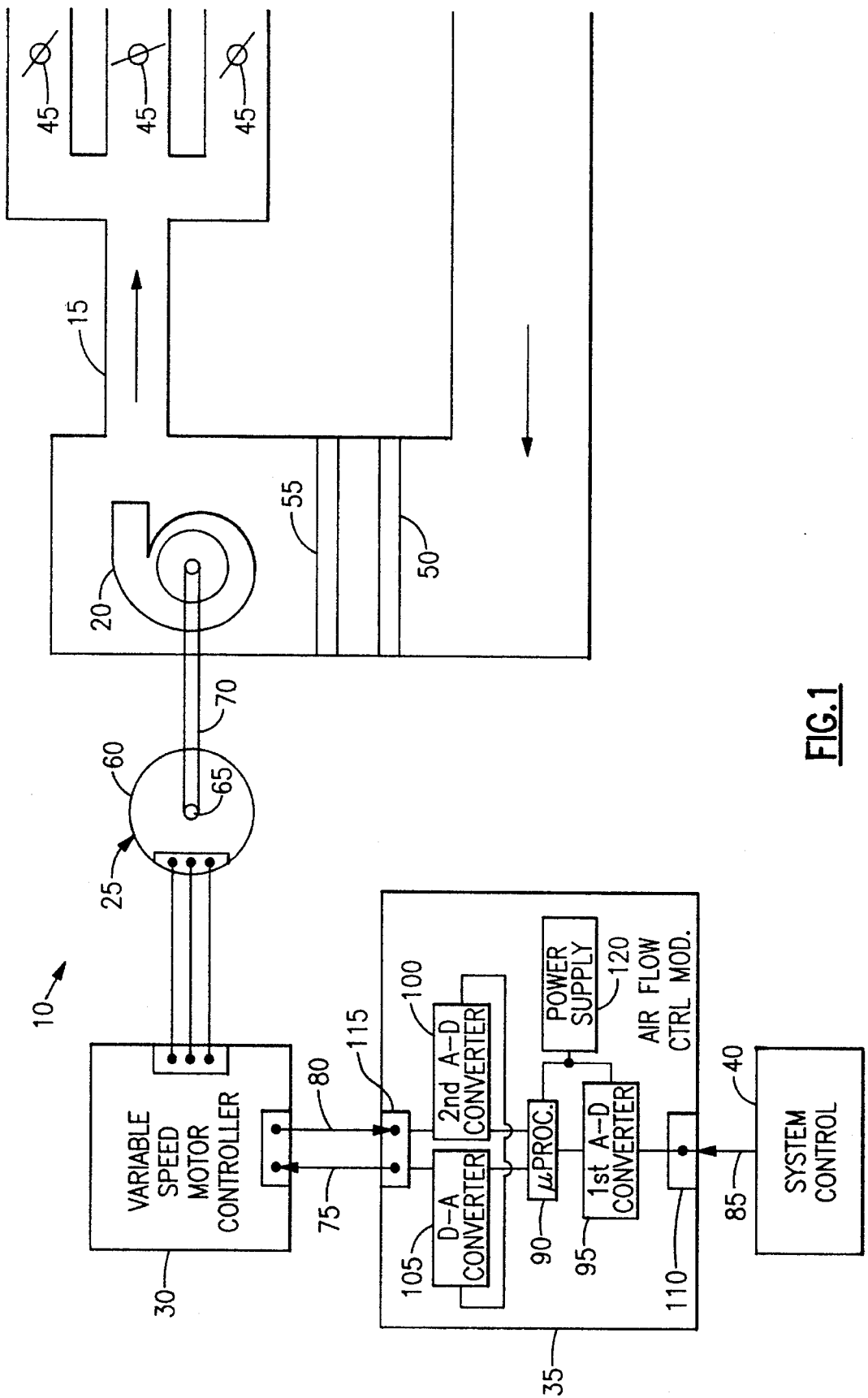
FIG. 1 is a block diagram of an air distribution system including a preferred embodiment of the present invention.

Referring now in detail to the drawings, FIG. 1 is a block diagram illustrative of an air distribution system 10 including a preferred embodiment of the present invention. The major components of the air distribution system 10 including the present invention comprise a duct system 15, a blower 20, a motor 25, a variable speed motor controller 30, an air flow control module 35, and a system control 40.

The duct system 15 is a conduit used for distributing air to the desired zones to be conditioned. For example, the duct system 15 may be installed in a building for providing conditioned air to desired rooms therein. As mentioned above, the static pressure within the duct system 15 is affected by dampers 45, filters 50, and heat exchangers 55 which are incorporated in the duct system 15.

The blower 20 is a device, such as a fan, for causing air to flow though the duct system 15 and is typically installed therein. In one preferred embodiment, the blower 20 comprises a forward curved centrifugal fan. However, the blower 20 may be any type of blade, fan, or other device for moving air in an air distribution system 10.

The motor 25 is a device for providing the necessary mechanical power for driving the blower 20. In one preferred embodiment, the motor 25 includes a stationary assembly 60 with a plurality of winding stages for carrying motor current and further includes a rotatable assembly 65 in driving relationship with the blower 20. The motor 25 may be any device capable of driving the blower 20 such as either a brush commutated motor or an electronically commutated motor. The motor 25 is drivingly connected to the blower 20 by a pulley system 70. Alternatively, the motor 25 and the blower 20 may be an integrated device such that the motor 25 is inserted into the blower 20, attached with a set screw, and electrically connected therein (not shown).

The variable speed motor controller 30 is a means for controlling the motor speed in response to a control signal 75 generated by the air flow control module 35 and a means for providing a speed signal 80 representative of the speed of the motor 25 as will be explained hereinbelow. Alternatively, the speed signal 80 may be provided by a separate device such as a commutation circuit commonly used in combination with electronically commutated motors. A General Electric model number HC44AE230 variable speed motor controller 30 may be used as the means for controlling the motor speed and as the means for providing a speed signal 80 in the present invention. The variable speed motor controller 30 is responsive to a control signal 75 representative of a desired speed for the motor 25 and is electrically connected to the air flow control module 35 for receiving the control signal 75. In one preferred embodiment, the control signal 75 takes the form of a pulse width modulated series of pulses with a duty cycle which is representative of the desired speed of the motor 25 for achieving the target air flow rate. As one skilled in the art will recognized, the control signal 75 may take a variety of forms such as a pulse amplitude modulation signal, a pulse position modulation signal, or a pulse code modulation signal. The pulse amplitude signal includes a series of pulses with amplitudes which are representative of the desired speed of the motor 25 for achieving the target air flow rate. The pulse position modulated signal includes a series of pulses with intervals between the pulses which are representative of the desired speed of the motor 25 for achieving the target air flow rate. The pulse code modulation signal includes a pulse code which is representative of the desired speed of the motor 25 for achieving the target air flow rate.

The variable speed motor controller 30 is also electrically connected to the motor 25 for applying a voltage to one or more of the winding stages at a time in accordance with the control signal 75 and for commutating the winding stages in a preselected sequence to rotate the rotatable assembly 65. Accordingly, the variable speed motor controller 30 controls the speed of the motor 25 in response to the control signal 75 provided by the air flow control module 35.

The air flow control module 35 is a means for providing a control signal 75 in response to both a target air flow rate signal 85 and the speed signal 80 as will be explained hereinbelow. The speed signal 80, as mentioned above, may either be generated by the variable speed motor controller 30 or, alternatively, by a separate device such as a commutation circuit. The target air flow rate signal 85 is generated by the system control 40 as is described hereinbelow. The air flow control module 35 comprises a microprocessor 90, first analog-to-digital converter 95, second analog-to-digital converter 100, a digital-to-analog converter 105, first terminal 110, second terminal 115, and a power supply 120. The first analog-to-digital converter 95 is electrically connected to the first terminal 110 and the microprocessor 90. Both the second analog-to-digital converter 100 and the digital-to-analog converter 105 are electrically connected to the microprocessor 90 and the second terminal 115. The power supply 120 is electrically connected to the microprocessor 90, the analog-to-digital converters 95, 100 and the digital-to-analog converter 105 for providing power to the aforesaid devices.

The system control 40 is a device or system which supplies the air flow control module 35 with a target air flow rate signal 85 representative of a desired air flow rate. The system control 40 may be responsive to sensors and user inputs (not shown). Preferably, the system control 40 provides the target air flow rate signal 85 having a varying analog voltage which is directly proportional to the target air flow rate. Alternatively, the target air flow rate signal 85 may have several discrete voltage levels, each representing a specific desired air flow rate. In one preferred embodiment, the target air flow rate signal 85 has three possible preset voltage levels. For example, the magnitude of the target air flow rate signal 85 may be one volt, three volts, or five volts which respectively represent a target air flow rate of low, medium, or high.

In one preferred embodiment according to the invention, the air flow control module 35 operates in accordance with a constant air flow algorithm for controlling and compensating the motor speed. This algorithm allows the motor 25 to provide a constant air flow within the air distribution system 10 regardless of variations in the static pressure. Controlling the motor 25 in this manner provides enhanced independence of the air flow rate to the static pressure within the air distribution system 10. The constant air flow algorithm demonstrates the cooperation of the present invention and is described hereinbelow.

Figures 2, 3:
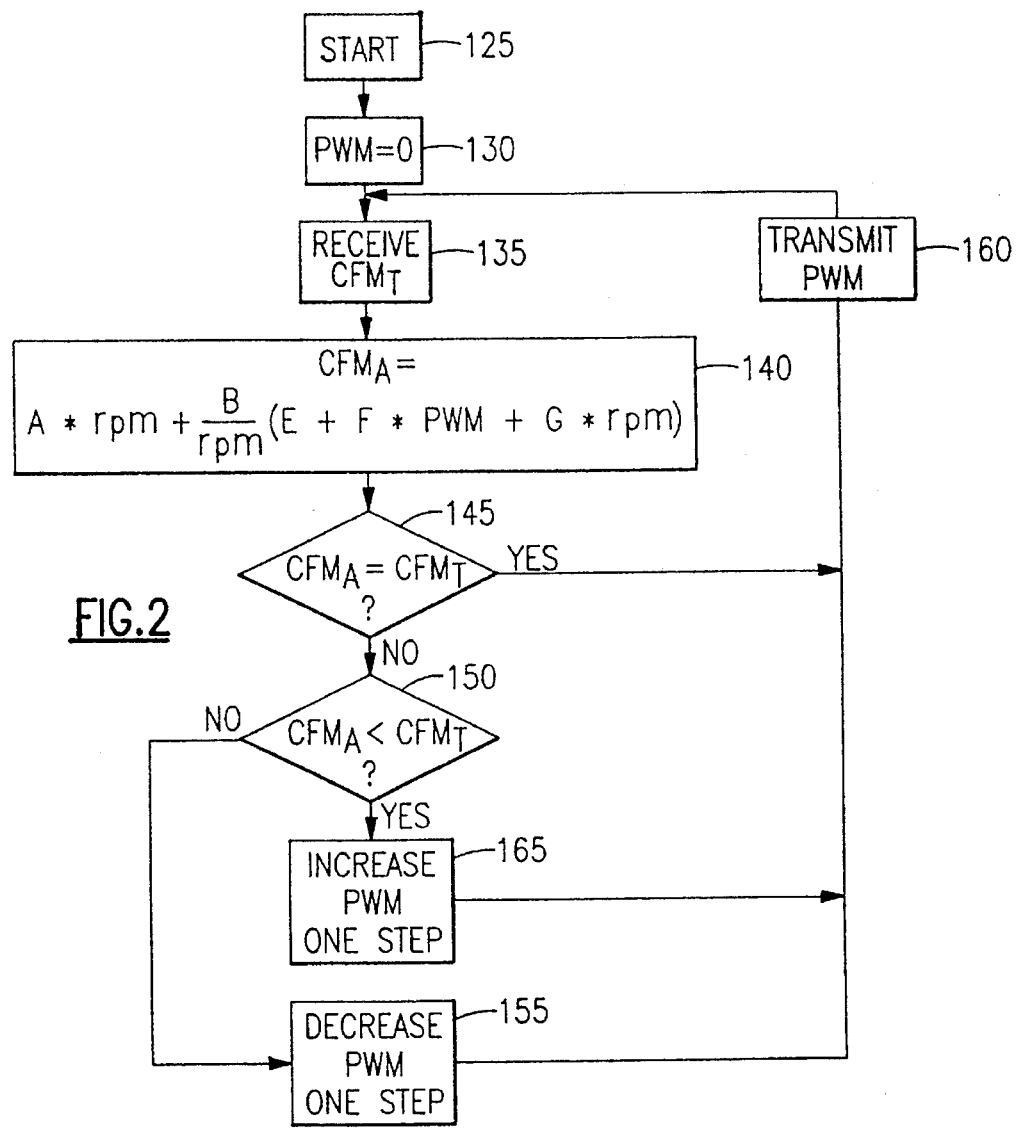
FIG. 2 is a flow diagram of a preferred algorithm embodied in the present invention.
FIG. 3 is a performance chart of the present invention.

FIG. 2 is a flow diagram of the constant air flow algorithm embodied in the present invention. Beginning at block 125 labeled "start" the first step performed 130 is to initialize the control signal 75 to a value of zero. In one preferred embodiment, the control signal 75 is a digital signal which may have an integer value from 0 to 128. In step 135, the air flow control module 35 receives the selected target air flow rate signal 85 ("$CFM_T$") transmitted from the system control 40. The air flow control module 35 converts this analog signal to a digital format using the first analog-to-digital converter 95 which then transmits the signal to the microprocessor 90. The microprocessor 90 also receives the speed signal 80 from the variable speed motor controller 30 which is converted to a digital format using the second analog-to-digital converter 100. The microprocessor 90, utilizing these signals, generates the control signal 75 for transmission to the variable speed motor controller 30 as will be explained hereinbelow.

In step 140, the microprocessor 90 implements the following algorithm: $CFM_A = A * rpm + (B/rpm) * (E + F * PWM + G * rpm)$, wherein $CFM_A$ is the actual air flow rate; rpm is the present value of the motor speed signal 80, PWM is the present value of the control signal 75; A and B are constants representing characteristics of the blower 20; and E, F, and G are constants representing the characteristics of the motor 25 and the variable speed motor controller 30. The constants A, B, E, F, G are all derived independent of the actual duct system 15. Thus, the present invention may be designed independently of the actual duct system 15 in which it is incorporated. This provides an advantage by allowing the present invention to be manufactured without the need for calibration with regard to a particular duct system 15.

In step 140 the microprocessor 90 utilizes the present values of the motor speed signal 80 and the control signal 75 to determine the $CFM_A$. Thus, a direct determination of the air flow is performed. After the $CFM_A$ is determined in step 140, the microprocessor 90 moves to step 145 and compares the $CFM_A$ with the $CFM_T$. If the actual and target air flow rates are equal then the microprocessor 90 does not change the present value of the PWM signal. The PWM signal is then converted to an analog signal by the digital-to-analog converter 105 and is then transmitted to the variable speed motor controller 30 in step 160. Ultimately, the microprocessor 90 returns to step 135 to begin the cycle again. The next cycle begins by receiving the $CFM_T$ in step 135 and calculating a new $CFM_A$ based on the new present values of the rpm and the PWM signals in step 140.

If the rates in step 145 are not equal then the microprocessor 90 moves to step 150 and considers whether $CFM_A$ is less than $CFM_T$. If $CFM_A$ is not less than $CFM_T$ then the microprocessor 90 moves to step 155 and reduces the present value of the PWM signal by one step. The digital PWM signal is next converted to an analog signal by the digital-to-analog converter 105 and is transmitted to the variable speed motor controller 30 in step 160. If, in step 150, it is found that the $CFM_A$ is less than $CFM_T$ then the microprocessor 90 moves to step 165 and PWM is increased one step. The microprocessor 90 next moves to step 160 and the digital PWM signal is converted to an analog signal by the digital-to-analog converter 105 and is transmitted to the variable speed motor controller 30. After the PWM is properly adjusted and transmitted to the variable speed motor controller 30, the microprocessor 90 returns to step 135 to start the cycle again.

Although the air flow control module 35 has been described as operating in accordance with an algorithm, one skilled in the art will readily recognize that the air flow control module 35 may also operate in accordance with a table defining the various speed-torque characteristics of the system.

FIG. 3 is a performance chart of one preferred embodiment of the present invention where the air flow control module 35 implements a constant air flow algorithm to maintain a constant air flow within the air distribution system 10. The first column represents the calculated values for the air flow given a particular blower geometry, motor 25, and variable speed motor controller 30. The second column represents the experimental values of the control signal 75. The third column represents the experimental values of the motor speed. The fourth column represents the experimental values of the air flow. The fifth column represents the experimental values of the static pressure. The sixth column represents the experimental values for the torque of the motor 25. The seventh column represents the percent error of the calculated values of the air flow and the experimental values of the air flow. As this chart illustrates, the present invention yields a small maximum percent error between the calculated air flow rate and the actual air flow rate determined experimentally. Thus, the present invention provides an improved system and method for conditioning air and for maintaining a preselected air flow rate of the conditioned air through at least part of the system regardless of the static pressure therein for use in conjunction with numerous duct systems without the need for calibration particular to the specific duct system.

Although the invention has been shown and described with respect to a best mode embodiment thereof, it should be understood by those skilled in the art that various other changes, omissions and additions in the form and detail thereof may be made therein without departing from the spirit and scope of the invention.

What is claimed is:

1. An apparatus for controlling an air distribution system of the type which includes a duct system, a motor drivingly associated with a blower and a target air flow rate signal which represents a target air flow for the air distribution system, the apparatus providing control of the motor speed to maintain a rate of air flow in the system at substantially the target air flow rate, wherein the apparatus comprises:

means for providing a speed signal representative of the speed of the motor;

means for providing a control signal in response to the target air flow rate signal and the speed signal, wherein the control signal is provided independent of the duct system;

means for controlling the motor speed in response to the control signal wherein the motor speed is controlled for maintaining the rate of air flow in the system at substantially the target air flow rate.

2. An apparatus as recited in claim 1 wherein said means for controlling the motor speed applies a voltage to the motor which varies in accordance with the control signal.

3. An apparatus as recited in claim 1 wherein said means for controlling the motor speed comprises a variable speed motor control.

4. An apparatus as recited in claim 3 wherein said variable speed motor controller provides the speed signal representative of the motor speed.

5. An apparatus as recited in claim 1 wherein said means for providing a control signal operates in accordance with the following algorithm:

$CFM_A = A * \text{rpm} + (B/\text{rpm}) * (E + F * PWM + G * \text{rpm})$,
   wherein $CFM_A$ equals the actual air flow rate; rpm equals the present value of the motor speed signal, PWM equals the present value of the control signal; A and B equal constants representing characteristics of the blower; and E, F, and G equal constants representing the characteristics of the motor and the means for controlling the motor speed in response to the control signal.

6. An apparatus as recited in claim 1 wherein the control signal generated by said means for providing a control signal comprises a pulse width modulated series of pulses having a duty cycle which is representative of the desired speed of the motor for achieving the target air flow rate.

7. An apparatus as recited in claim 1 wherein the control signal generated by said means for providing a control signal comprises a pulse amplitude modulated series of pulses each having an amplitude which is representative of the desired speed of the motor for achieving the target air flow rate.

8. An apparatus as recited in claim 1 wherein the control signal generated by said means for providing a control signal comprises a pulse position modulated series of pulses having intervals between the pulses which are representative of the desired speed of the motor for achieving the target air flow rate.

9. An apparatus as recited in claim 1 wherein the control signal generated by said means for providing a control signal comprises a pulse code modulated series of pulses having a pulse code which is representative of the desired speed of the motor for achieving the target air flow rate.

10. An air distribution system for providing conditioned air to desired zones and for maintaining a rate of air flow in a duct system at substantially a target air flow rate, wherein the system comprises:

a motor having a stationary assembly with a plurality of winding stages for carrying motor current and further having a rotatable assembly in driving relationship with a blower in the system;

means for providing a speed signal representative of the speed of the motor;

a microprocessor, responsive to the target air flow rate signal and the speed signal for generating a control signal which is a function of both the target air flow signal and the speed signal, wherein said control signal is provided independent of the duct system;

a variable speed motor controller for controlling the motor speed in response to the control signal wherein said variable speed motor controller applies a voltage to said motor which varies in accordance with the control signal.

11. The apparatus of claim 10 wherein said microprocessor operates in accordance with the following algorithm;

$CFM_A = A * rpm + (B/rpm) * (E + F * PWM + G * rpm)$, wherein $CFM_A$ equals the actual air flow rate; rpm equals the present value of the motor speed signal, PWM equals the present value of the control signal; A and B equal constants representing characteristics of the blower; and E, F, and G equal constants representing the characteristics of the motor and the means for controlling the motor speed in response to the control signal.

12. A method for controlling an air distribution system of the type which includes a motor drivingly associated with a blower and further including a target air flow rate signal which represents a target air flow for the air distribution system, the method providing control of the motor speed to maintain a rate of air flow in the system at substantially the target air flow rate, the method comprising the steps of:

sensing the target air flow;

sensing the motor speed;

determining, by use of a microprocessor, the actual air flow which is a function of the sensed motor speed;

generating, by use of the microprocessor, a control signal which is a function of the sensed motor speed and the sensed target air flow;

applying a voltage to the motor which varies in accordance with the control signal wherein applying the voltage provides control of the motor speed to maintain a rate of air flow in the system at substantially the target air flow rate.

13. The method of claim 12 wherein the microprocessor in said determining the actual air flow step operates in accordance with the following algorithm;

$CFM_A = A * rpm + (B/rpm) * (E + F * PWM + G * rpm)$, wherein $CFM_A$ equals the actual air flow rate; rpm equals the present value of the motor speed signal, PWM equals the present value of the control signal; A and B equal constants representing characteristics of the blower; and E, F, and G equal constants representing the characteristics of the motor and the means for controlling the motor speed in response to the control signal.

* * * * *